US008688182B2

(12) United States Patent (10) Patent No.: US 8,688,182 B2
Soika et al. (45) Date of Patent: Apr. 1, 2014

(54) SUPERCONDUCTIVE CABLE

(75) Inventors: Rainer Soika, Hannover (DE); Mark Stemmle, Hannover (DE)

(73) Assignee: Nexans, Paris (FR)

( * ) Notice: Subject to any disclaimer, the term of this patent is extended or adjusted under 35 U.S.C. 154(b) by 13 days.

(21) Appl. No.: 13/411,832

(22) Filed: Mar. 5, 2012

(65) Prior Publication Data

US 2012/0252677 A1 Oct. 4, 2012

(30) Foreign Application Priority Data

Apr. 4, 2011 (EP) ..................................... 11305386

(51) Int. Cl.
*H01L 39/14* (2006.01)
(52) U.S. Cl.
USPC .......................................................... 505/231
(58) Field of Classification Search
USPC ................ 505/230, 231, 430, 431; 174/125.1
See application file for complete search history.

(56) References Cited

U.S. PATENT DOCUMENTS

| 2002/0098985 | A1* | 7/2002 | Ladie' et al. | .................. 505/100 |
| 2004/0138066 | A1* | 7/2004 | Sinha et al. | .................. 505/231 |
| 2010/0179064 | A1* | 7/2010 | Willen et al. | ................. 505/230 |

FOREIGN PATENT DOCUMENTS

| WO | 03012460 | 2/2003 |
| WO | 2004013868 | 2/2004 |

OTHER PUBLICATIONS

International Search Report dated Aug. 25, 2011.

* cited by examiner

*Primary Examiner* — Colleen Dunn
(74) *Attorney, Agent, or Firm* — Sofer & Haroun, LLP

(57) ABSTRACT

A superconductive electric cable is provided in which a cable core is arranged in a cryostat, where the cable core is composed of three phase conductors arranged concentrically around an inner cooling duct, with an electric insulation arranged between the phase conductors, and where the cryostat is surrounded by an electric insulation, which is surrounded by a neutral conductor of normally conductive materials. In this cable, a neutral conductor or a screening is arranged only outside of the cryostat, and is formed by normally conductive material which surrounds the cryostat as a common neutral conductor, where an insulating material is arranged between this neutral conductor and the cryostat.

16 Claims, 1 Drawing Sheet

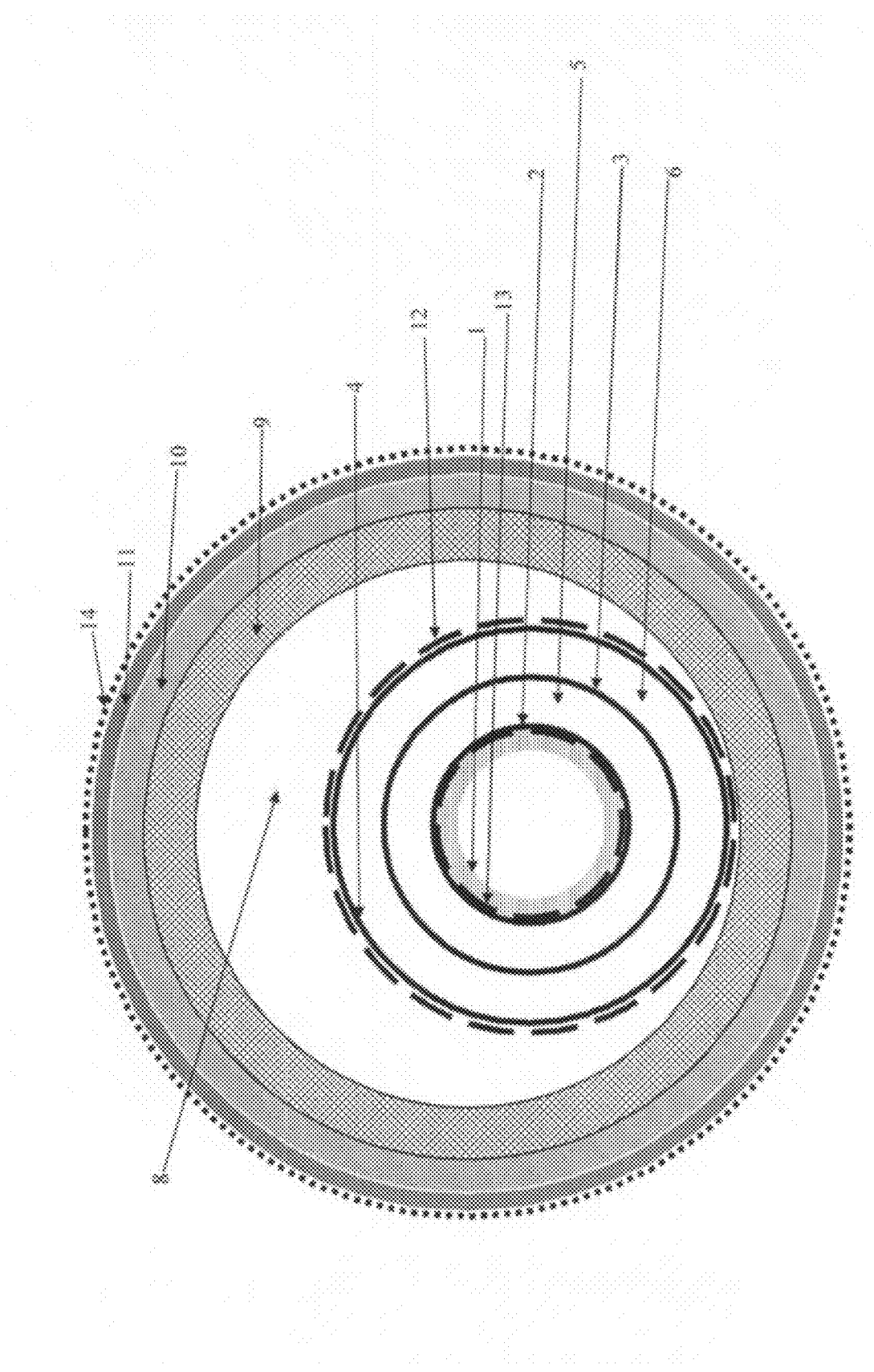

SUPERCONDUCTIVE CABLE

RELATED APPLICATION

This application claims the benefit of priority from European Patent Application No. 11 305 386.2, filed on Apr. 4, 2011, the entirety of which is incorporated by reference.

BACKGROUND

1. Field of the Invention

The invention relates to a superconductive electric cable in which concentrically arranged superconductive phase conductors, in particular three concentrically arranged superconductive phase conductors, are arranged in a cryostat with an electric insulation arranged between the phase conductors. The phase conductors and the insulations arranged between the phase conductors are arranged around a cooling duct which preferably has a ring-shaped cross section. The cryostat of the above described cable has two concentrically arranged casings. The undulated pipes are preferably of metal, particularly high-grade steel, with spacers and/or insulations being arranged between the undulated pipes, wherein the intermediate space between the casings is evacuated. The concentrically arranged phase conductors are placed within the cryostat and are in contact with cooling medium, particularly liquid nitrogen.

2. Description of the Related Art

WO 2004/013868 describes a superconductive cable with three coaxial phase conductors between which an insulating layer each is arranged. The outer phase conductor is surrounded by a further insulating layer on which a screening of copper is placed. This cable core is arranged in a cryostat including its circumferential screening.

OBJECT AND SUMMARY OF THE INVENTION

It is the object of the invention to make available a superconductive cable which is of an alternative construction, and permits a smaller inner diameter of the cryostat, particularly when the concentric superconductive phase conductors have the same diameter.

In accordance with the invention, the above object is met by a cable as set forth in the Claims, and particularly with a superconductive electric cable in which a cable core is arranged in a cryostat which includes two concentrically arranged undulated pipes with a vacuum in the intermediate space, wherein the cable core is composed of three phase conductors arranged concentrically around an inner cooling duct with an electric insulation between the phase conductors, and the cryostat is surrounded by an electric insulation, particularly an extruded or wound insulating layer, which is surrounded by a neutral conductor of normally conductive material, particularly copper. In this cable, a neutral conductor or a screening is arranged outside of the cryostat only and is formed of a normally conductive material which surrounds the cryostat as a common neutral conductor of the cryostat, wherein an insulating jacket is arranged between the neutral conductor and the cryostat.

The cable core may be composed of two preferably three, superconductive phase conductors arranged around a common cooling duct, so that, in accordance with the invention, an insulation is present within the cryostat always only between the phase conductors and, for example, the outer phase conductor is arranged without circumferential insulation within the cryostat, and also between the inner cooling duct and the inner superconductive phase conductor essentially no insulation material is arranged.

In accordance with the invention, the insulation which consists of insulation material placed between the concentric superconductive phase conductors is a so-called cold dielectric, namely an insulating material which is penetrated or impregnated, especially with liquid nitrogen. Such a cold dielectric forms an effective insulation between the phase conductors.

The construction of the cable according to the invention has the advantage that the cable core arranged in a cooling duct has a small outer diameter because the cable core consists of a first superconductive phase conductor resting on the cooling duct, a first dielectric arranged on the first phase conductor, a second superconductive phase conductor arranged concentrically around the first insulation, a second insulation concentrically surrounding the second phase conductor, and a third superconductive phase conductor arranged concentrically on the second insulation, so that the cable core does not comprise, for example, any insulation arranged circumferentially on the third phase conductor, and/or a screening which raises the total diameter of the cable core relative to the diameter of the outer phase conductor.

Therefore, the cable core of the cable according to the invention makes it possible that the cryostat has a smaller inner diameter than would be required for a cable core with a greater outer diameter. Accordingly, the cable according to the invention has a smaller input of heat than a cable with a cryostat with a larger inner diameter. In the alternative to a cryostat with a smaller inner diameter, the cable according to the invention can have a cryostat whose inner diameter can receive a cable core with a larger diameter, so that the outer cooling duct between the cryostat and the cable core has a greater cross section.

Another advantage can be found in the cable according to the invention, in that the screening is arranged outside of the cryostat and, therefore, any occurring heat losses do not have to be discharged through the cooling agent which flows through the cryostat. Moreover, the arrangement of the neutral conductor or the screening outside of the cryostat ensures that the neutral conductor consists of a normally conductive material, for example, copper.

In the cable according to the invention, heat produced by compensating flows in the neutral conductor is produced outside of the cryostat, so that this heat does not flow off through the cooling agent contained in the cryostat. Therefore, the arrangement of the neutral conductor outside of the cryostat leads to a smaller load acting on the cooling device which makes available or cools the cooling agent.

Furthermore, there is the heat generated outside of the cryostat by dielectric losses within the insulation which surrounds the outer phase conductor of the cable core. In the same manner, in the embodiment according to the invention in which the cable core has no circumferential insulation, but the insulation is arranged outside of the cryostat, a small heat input into the cooling medium takes place. In this connection, the outer phase conductor of the cable core can directly contact the cryostat, or the cable core has on the other phase conductor a circumferential protective layer which contacts the cryostat.

Since the cable contains a cable core which advantageously has no insulation placed on its outer phase conductor, the total diameter of the cable core is formed by the inner cooling duct, the first superconductive phase conductor placed on the cooling duct, and the further concentrically arranged superconductive phase conductor with an insulation respectively arranged therebetween, so that no insulation surrounding the outer phase conductors contributes to the total diameter of the cable core. This cable core produces in the case of temperature changes, for example when cooling ambient temperature to the temperature of the cooling agent, smaller longitudinal forces than a cable core with a greater number of layers. Therefore, in the cable according to the invention, lower forces occur in the case of temperature changes than in cables with thicker cable cores, which are advantageous for the requirements made with respect to resilience, for example, of the cryostat and its durability.

The insulation which is placed between the outer common neutral conductors and forms the outermost layer and the outermost wall of the cryostat may be of polymer material which is injection molded and/or wound around the cryostat.

The cable core arranged in the cryostat has or consists of an inner cooling duct, also called carrier, a first superconductive phase conductor placed on the cooling duct, a first dielectric placed on the first superconductive phase conductor, a second superconductive phase conductor on the first cold dielectric, a second superconductive phase conductor, a second cold dielectric surrounding the second superconductive phase conductor, and a third superconductive phase conductor on the second cold dielectric and opposite the second superconductive phase conductor, and a third superconductive phase conductor. Cold dielectric may be, for example, several paper layers wound together, for example, paper laminated with synthetic material e.g., polypropylene, into which the cooling agent can penetrate. The inner cooling duct is, for example, a pipe having a circular or ring-shaped cross section which optionally has a ring-shaped or helical radial undulation, and is particularly of metal, for example, copper, brass or high-grade steel.

The superconductive phase conductor is composed preferably, for example, of one or more bands with or of superconductive material, for example, bands with a support and a layer of superconductive material, wherein the bands are wound parallel to each other and tightly against each other with a pitch which is preferably large, around the longitudinal axis of the inner cooling duct, optionally in several layers. Each superconductive phase conductor can be wound with a pitch which is directed in the same direction or the opposite direction, and optionally with a non-conductive material arranged between the layers which form a phase conductor.

The invention further relates to a method of manufacturing the superconductive cable according to the invention. In this manufacturing process, the cable core is manufactured and subsequently arranged in a cryostat, for example, by pulling the cable core into a prefabricated cryostat with two spaced-apart, concentrically arranged casings, preferably of metal, with spacers and/or insulation arranged therebetween, wherein the intermediate space between the casings is evacuated. When the process is carried out, the cable core is preferably produced by arranging superconductive bands around an inner cooling duct for creating a first superconductive phase conductor, arranging a first insulation about the first superconductive phase conductor, arranging superconductive bands around the first insulation for creating a second superconductive phase conductor, arranging a second insulation around the second superconductive phase conductor and arranging superconductive bands around the insulation for creating a third superconductive phase conductor. The cryostat is provided, before or after arranging the cable core in the cryostat, with a third insulation, for example, by injection molding and/or winding the outer circumferential surface of the cryostat with a cross-linked polymer, and subsequently placing a metal casing resting on the third insulation, which form the common neutral conductor and the outer surface of the cable. The metal casing can be constructed by winding metal bands around the third insulation which are arranged, for example, with a long pitch length in one or several layers. Optionally, another insulating layer is placed around the neutral conductor, wherein the insulating layer is composed, for example, of extruded synthetic material, particularly PE.

The first and second insulations are produced by winding around them an insulation material on the basis of paper. The inner cooling duct is preferably an undulated pipe of high-grade steel with a ring-shaped cross section.

BRIEF DESCRIPTION OF THE DRAWINGS

The sole FIGURE shows a superconducting cable in accordance with one embodiment.

DETAILED DESCRIPTION OF THE INVENTION

The invention will now be described in more detail with respect to the FIGURE which schematically shows a cross sectional view of a cable according to the invention.

In the cable according to the invention, the cable core consists of an inner cooling duct 1, for example, a pipe of copper-containing material, particularly with a round cross section, on which are placed directly or separated by a thin protective layer 13, a first superconductive phase conductor 2, which for example, consists of superconductive bands which are wound with a long pitch length around the inner cooling duct 1. A second superconductive phase conductor 3 and a third superconductive phase conductor 4 concentrically surrounding the second superconductive phase conductor 3 are arranged concentrically around the first superconductive phase conductor 2, wherein the first superconductive phase conductor 2 is spaced from the second superconductive phase conductor 3 by the first electric insulation 5 arranged between the superconductive phase conductors 2 and 3, and the third superconductive phase conductor 4 is spaced by a second electric insulation 6 arranged between the superconductive phase conductor 4 and the second superconductive phase conductor 3. The first and second electric insulations 5, 6 are each formed by a cold dielectric, particularly a wound dielectric on the basis of paper, which is penetrated by a cooling agent, particularly impregnated with liquid nitrogen. The optional protective layer 13 which rests on the inner cooling duct 1 and borders the first superconductive phase conductor 2 may include, for example, paper, particularly soot paper or metallic bands, for example of high-grade steel, as well as a combination of the two, or may consist of one of the two or of their combination. The third superconductive phase conductor 4 is not insulated on the surface located opposite the second insulation 6 and, thus, does not have a circumferentially closed insulation relative to the cryostat 9. The third superconductive phase conductor 4 may be placed directly on the inner wall of the cryostat 9 which is formed by two concentrically arranged casings with an insulation placed between the casings with a vacuum. Alternatively, a thin protective layer 12, which may be constructed either with metal or without metal, may be placed around the third superconductive phase conductor 4. This optional thin protective layer 12 forms the outer circumferential surface of the cable core and may be constructed in the same manner as the protective layer 13 placed on the inner cooling duct. The protective layer 12 placed on the third superconductive phase conductor 4 may include, instead of or in addition or alternatively to a paper layer, at least one wound metal band or may consist thereof, for example, a bronze band. A metal band wound as a protective layer 12 on the third superconductive phase conductor 4 or on the paper wound around the third superconductive phase conductor 4, is preferably not wound so as to overlap itself.

In accordance with the invention, the cable core is preferably composed from the inside toward the outside of a first superconductive phase conductor arranged concentrically around the inner cooling duct 1, a first electric insulation 5, a second superconductive phase conductor 3, a second electric insulation 6, and third superconductive phase conductor 4. The space between the outer circumferential surface of cable core and the inner wall of the cryostat 9 form an outer cooling duct 8 through which cooling medium can be allowed to flow, in the same manner as through the inner cooling duct 1.

In accordance with the invention, the cryostat 9 is surrounded by a neutral conductor 11 spaced apart by an electric insulation 10. Generally, an insulating layer 14, for example, extruded synthetic material, for example, PE (polyethylene) may be applied around the neutral conductor 11. The construction of the cable core of the cable according to the invention has a small outer diameter, so that the clear inner diameter of the cryostat 9 can be smaller in comparison with previously known superconductor cables of the same type. The heat losses produced in the neutral conductors 11 forming the outer wall of the cable are generated outside of the cryostat 9, as is the case for the heat losses in the third electric insulation 10, which preferably are of synthetic material. Therefore, in the cable according to the invention the third electric insulation which fills out the space between the cryostat 9 and the neutral conductor 11, may, form a third electric insulation 10, as well as a thermal insulation between cryostat 9 and neutral conductor 11.

The invention claimed is:

1. Superconductive cable comprising:
   a cryostat; and
   a cable core arranged therein, wherein said cable core includes, from the inside toward the outside concentrically around an inner cooling duct,
   a first superconductive phase conductor,
   a first electric insulation,
   a second superconductive phase conductor,
   a second electric insulation, and
   a third superconductive phase conductor,
   wherein the cryostat is surrounded by a third electric insulation, and a neutral conductor having a circular cross section placed on the third electric insulation.

2. Cable according to claim 1, wherein the cable core is composed of the inner cooling duct, the first superconductive phase conductor, the first electric insulation, the second superconductive phase conductor, the second electric insulation, and the third superconductive phase conductor.

3. Cable according to claim 1, wherein a protective layer of metal and/or insulating material is arranged between the inner cooling duct and the first superconductive phase conductor.

4. Cable according to claim 1, wherein a protective layer of metal and/or insulating material is mounted on the third superconductive phase conductor.

5. Cable according to claim 3, wherein the insulating material of each protective layer is independently of paper and/or soot paper, the metal material of the protective layer is a bronze band wound around the third superconductive phase conductor, and the protective layer contains bands of high-grade steel.

6. Cable according to claim 1, wherein a layer of insulating material is mounted on the neutral conductor.

7. Cable according to claim 1, wherein the neutral conductor is composed of the metal neutral conductor forming the outer layer of the cable.

8. Cable according to claim 1, wherein the first and second electric insulations are composed of wound paper layers which are permeable to cooling medium.

9. Cable according to claim 1, wherein the third insulation is a polymer extruded or wound around the cryostat.

10. Cable according to claim 1, wherein the neutral conductor is composed of stranded bands of copper-containing material, or is a longitudinally welded metal pipe having a cylindrical circumference or with a helical or ring-shaped undulation.

11. Method of manufacturing a superconductive cable for producing a cable core and arranging the cable core in a cryostat, said method comprising the steps of:
   arranging of superconductive bands around a carrier with a ring-shaped cross section made available as an inner cooling duct for producing a first superconductive phase conductor;
   arranging a first insulation around the first superconductive phase conductor;
   arranging superconductive bands around the first insulation for producing a second superconductive phase conductor;
   arranging a second insulation around the second superconductive phase conductor and arranging superconductive bands around the second insulation for producing a third superconductive phase conductor arranging a third electric insulation around the cryostat; and
   arranging on the third electric insulation a metal casing as a common neutral conductor for the superconductive phase conductors.

12. Method according to claim 11, wherein the cable core is composed of the inner cooling duct, the first superconductive phase conductor, the first electric insulation, the second superconductive phase conductor, the second electric insulation, and the third superconductive phase conductor.

13. Method according to claim 11, wherein the third electric insulation is manufactured by injection molding around the cryostat with a cross-linkable synthetic material.

14. Method according to claim 11, wherein, prior to arranging superconductive bands around the inner cooling duct for producing a first superconductive phase conductor, arranging a protective layer on the inner cooling duct.

15. Method according to claim 11, wherein, after arranging superconductive bands around the second insulation for producing a third superconductive phase conductor, arranging a protective layer on the third superconductive phase conductor.

16. Method according to claim 11, wherein, after arranging the neutral conductor, arranging another protective layer around the neutral conductor.

* * * * *